United States Patent
Seward et al.

(10) Patent No.: US 10,542,585 B2
(45) Date of Patent: Jan. 21, 2020

(54) GATEWAY USING RESOURCE DIRECTORY

(71) Applicant: Silicon Laboratories Inc., Austin, TX (US)

(72) Inventors: DeWitt Clinton Seward, Arlington, MA (US); Preston Fick, Austin, TX (US); Clay Daigle, Austin, TX (US); Greg Hodgson, Austin, TX (US); Lee Byrd, Mamaroneck, NY (US)

(73) Assignee: Silicon Laboratories, Inc., Austin, TX (US)

(*) Notice: Subject to any disclaimer, the term of this patent is extended or adjusted under 35 U.S.C. 154(b) by 0 days.

(21) Appl. No.: 15/716,966

(22) Filed: Sep. 27, 2017

(65) Prior Publication Data

US 2019/0098700 A1 Mar. 28, 2019

(51) Int. Cl.
| | |
|---|---|
| *H04W 4/00* | (2018.01) |
| *H04W 88/16* | (2009.01) |
| *H04L 29/12* | (2006.01) |
| *H04L 12/66* | (2006.01) |
| *H04W 4/38* | (2018.01) |

(52) U.S. Cl.
CPC .............. *H04W 88/16* (2013.01); *H04L 12/66* (2013.01); *H04L 61/251* (2013.01); *H04L 61/2517* (2013.01); *H04W 4/38* (2018.02)

(58) Field of Classification Search
CPC ....... H04W 4/80; H04W 84/12; H04W 76/14; H04W 8/005
See application file for complete search history.

(56) References Cited

U.S. PATENT DOCUMENTS

| | | | |
|---|---|---|---|
| 7,779,111 B2 | 8/2010 | Shiraiwa et al. | |
| 9,178,749 B2 | 11/2015 | Levine et al. | |
| 10,057,382 B2 | 8/2018 | Sathyadevan et al. | |
| 2008/0056261 A1 | 3/2008 | Osborn et al. | |
| 2009/0198806 A1 | 8/2009 | Kim et al. | |
| 2011/0149932 A1 | 6/2011 | Kim et al. | |
| 2014/0313882 A1* | 10/2014 | Rucker | H04W 4/70 370/219 |
| 2014/0359131 A1* | 12/2014 | Seed | H04W 4/70 709/226 |
| 2015/0156349 A1 | 6/2015 | Fukushima | |

(Continued)

OTHER PUBLICATIONS

'Dotdot. Who's there? Yet another IoT app layer', by Gareth Corfield (Jan. 4, 2017); pp. 1-3 (Year: 2017).*

(Continued)

*Primary Examiner* — Khalid W Shaheed
(74) *Attorney, Agent, or Firm* — Nields, Lemack & Frame, LLC (57) ABSTRACT

A system and method for allowing legacy devices to be discovered on a DotDot network is disclosed. The system includes a gateway device to interface between DotDot devices and legacy devices. In some embodiments, the gateway device has a plurality of network interfaces to communicate with these legacy devices. The gateway device discovers the legacy devices that it can communicate with. The gateway device then presents information about these legacy devices in a Resource Directory. In some embodiments, the Resource Directory is maintained within the gateway device. In other embodiments, the gateway device utilizes a Resource Directory that exists on the DotDot network.

11 Claims, 6 Drawing Sheets

(56) References Cited

U.S. PATENT DOCUMENTS

| | | | |
|---|---|---|---|
| 2016/0164728 A1 | 6/2016 | Chakrabarti et al. |
| 2016/0205078 A1 | 7/2016 | James et al. |
| 2016/0380968 A1 | 12/2016 | Sarwar et al. |
| 2017/0279829 A1 | 9/2017 | Vasseur et al. |
| 2018/0034914 A1 | 2/2018 | Christopher et al. |
| 2018/0262597 A1 | 9/2018 | Matthieu et al. |
| 2018/0367646 A1 | 12/2018 | Seward |
| 2019/0097842 A1 | 3/2019 | Seward et al. |
| 2019/0098701 A1 | 3/2019 | Seward et al. |

OTHER PUBLICATIONS

Zigbee Cluster Library Specificatioin (Revision 6) ( Jan. 14, 2016), pp. 1 & 45 (Year: 2016).*

Wong, Jan. 17, 2017, "Zig Bee DotDot Dashes to Unify Connectivity Stacks", ElectronicDesign.com, pp. 1-13.

Wroclawski, 2014, "We're losing the war for the smart home", Reviewed.com, pp. 1-8.

Office action dated Jun. 26, 2018 in co-pending U.S. Appl. No. 15/626,618.

Hossen et al., "Interconnection between 802.15.4 Devices and 1Pv6: Implications and Existing Approaches", International Journal of Computer Science Issues, vol. 7, Iss. 1, No. 1, Jan. 2010. pp. 19-31.

Ovrebekk, "Why run 1Pv6 Over Bluetooth low energy?", Nordic Semiconductor, GetConnectedBlog—Your Guide to the Amazing World of IoT, via Archive.org—Wayback Machine, Snapshot captured Aug. 27, 2017, published Sep. 27, 2016.

Wang et al., "Internetworking Between ZigBee/802.15.4 and IPv6/802.3 Network", Sigcomm 2007 Workshop on IPv6 and the future of the internet in Kyoto, Japan. Aug. 2007.

Office action dated Nov. 14, 2018 in co-pending U.S. Appl. No. 15/717,008.

Final rejection dated Jan. 23, 2019 in co-pending U.S. Appl. No. 15/626,618.

Office action dated Feb. 6, 2019 in co-pending U.S. Appl. No. 15/716,999.

Notice of allowance dated Jun. 24, 2019 in co-pending U.S. Appl. No. 15/626,618.

* cited by examiner

GATEWAY USING RESOURCE DIRECTORY

This disclosure describes systems and methods allowing legacy devices to operate on a DotDot network.

BACKGROUND

The explosion of network connected devices has led to an increased use of certain protocols. ZigBee Cluster Library over IP (ZCLIP), also referred to as DotDot, is a new standard intended to improve the security and universal connectivity of the Internet of Things (IoT). As the adoption of DotDot continues to grow, there will be an entire set of infrastructure developed to allow communication between DotDot devices and the cloud, which includes PCs, smart phones, cloud servers and other devices. DotDot is an application layer which may be utilized with different network layers. One such network layer is known as Internet Protocol (IP). Further, there are two versions of Internet Protocol; version 4 (IPv4) and version 6 (IPv6).

However, there are already millions of devices that communicate wirelessly using other protocols, such as ZigBee®, BlueTooth, BLE and others. For example, ZIGBEE® is now commonly used in many applications, including utility meters, lighting systems and the like.

There is a need to find a way in which the currently existing devices, which do not utilize the DotDot protocol, can be included as part of an existing network. Obviously, retrofitting all of these existing devices with new software and possibly new hardware is not feasible for many reasons.

Therefore, there needs to be a system and method that allows these legacy devices to operate on a DotDot network without requiring any changes to these legacy devices. However, there are now security requirements associated with the DotDot protocol that complicate this objective. Further, it would be beneficial if there were a system and method to discover the existence of these legacy devices.

SUMMARY

A system and method for allowing legacy devices to be discovered on a DotDot network is disclosed. The system includes a gateway device to interface between DotDot devices and legacy devices. In some embodiments, the gateway device has a plurality of network interfaces to communicate with these legacy devices. The gateway device discovers the legacy devices that it can communicate with. The gateway device then presents information about these legacy devices in a Resource Directory. In some embodiments, the Resource Directory is maintained within the gateway device. In other embodiments, the gateway device utilizes a Resource Directory that exists on the DotDot network.

According to one embodiment, a gateway device is disclosed. The gateway device comprises a DotDot network interface; a secondary network interface; a processing unit and a memory device, where the memory device comprises instructions, which when executed by the processing unit, allow the gateway device to: communicate with a legacy device on the secondary network interface; obtain data from the legacy device; and post the data in a Resource Directory. In some embodiments, the Resource Directory is disposed within the gateway device. In certain embodiments, the Resource Directory is disposed in a DotDot device accessible via the DotDot network interface. In certain embodiments, the gateway device further comprises instructions, which when executed by the processing unit, allow the gateway device to: determine whether the legacy device is a sleepy device.

According to another embodiment, a gateway device is disclosed. The gateway device comprises a DotDot network interface; a secondary network interface; a processing unit and a memory device, where the memory device comprises instructions, which when executed by the processing unit, allow the gateway device to: indicate to DotDot devices via the DotDot interface that the gateway device serves as a Resource Directory; receive data from a legacy device on the second network interface; and return the data to a DotDot device in response to a query of the Resource Directory. In certain embodiments, a plurality of legacy devices is accessible via the secondary network interface, and the gateway device stores data from each of the plurality of the legacy devices in the Resource Directory. In certain embodiments, the gateway device receives updated data from the legacy device and updates the data in the Resource Directory. In some embodiments, the gateway device further comprises instructions, which when executed by the processing unit, allow the gateway device to: store the data in a format that is defined for a Resource Directory.

According to another embodiment, a gateway device is disclosed. The gateway device comprises a DotDot network interface; a secondary network interface; a processing unit and a memory device, where the memory device comprises instructions, which when executed by the processing unit, allow the gateway device to: indicate to DotDot devices via the DotDot interface that a Resource Directory is disposed on a private network accessible by the gateway device; receive data from a legacy device on the second network interface; and return the data to a DotDot device in response to a query of the Resource Directory. In some embodiments, the gateway device creates a virtual device, the virtual device having a different address than the gateway device. In certain embodiments, the virtual device has a different IPv6 address than the gateway device. In other embodiments, the virtual device is accessible via a port on a IPv4 address of the gateway device. In other embodiments, the virtual device is represented as an endpoint on the gateway device. In certain embodiments, the data is stored in the gateway device. In certain embodiments, the secondary network utilizes a ZIGBEE® protocol.

BRIEF DESCRIPTION OF THE DRAWINGS

For a better understanding of the present disclosure, reference is made to the accompanying drawings, in which like elements are referenced with like numerals, and in which.

DETAILED DESCRIPTION

As described above, DotDot is an emerging network protocol that allows communication over IP. While intended for wireless communications to support the Internet of Things (IoT), it is also usable over wired connections. The DotDot specification describes a generic application layer which can be used with different network stacks. For example, Thread is actively working on a network stack that is compatible with DotDot. DotDot defines an application layer. This application layer is similar to that already defined by the ZIGBEE® protocol. Stated differently, DotDot does not mandate a particular physical interface, but does mandate a specific application layer. In many embodiments, DotDot utilizes a network layer that relies on the Internet Protocol (IP). This network layer may be Internet Protocol version 4 (IPv4) or Internet Protocol version 6 (IPv6).

DotDot leverages a mechanism specified by CoAP that allows for the discovery of other devices on the network. Specifically, CoAP defines a Resource Directory. Servers may use the CoRE Link Format to register resources with a Resource Directory or to allow a Resource Directory to poll for resources. These resources may then be discovered by any client by making a request to the Resource Directory lookup interface.

The Resource Directory may have other functions as well. For example, DotDot supports the concept of a sleepy device, which is a device that is not always available on the network. A sleepy device may enter a low power state for extended periods of time, and enter an operational state infrequently. While in the low power state, the sleepy device cannot respond to any network activity. Often these sleepy devices are used to periodically monitor a condition. For example, a sleepy device may serve a temperature sensor, which checks the temperature at periodic intervals, such as every five minutes. The device reports the new temperature reading and then returns to its low power state. However, other devices on the DotDot network may need to obtain this information about the temperature while the temperature sensor is in its low power state. However, since the temperature sensor is now in its low power state, that device cannot provide that information. Thus, DotDot allows the Resource Directory to be used to store relevant information on behalf of these sleepy devices. In the above example, the temperature sensor may provide its temperature reading to a Resource Directory before entering the low power state. In this way, when another device requires the temperature information, the most up-to-date information can be found at the Resource Directory. Thus, the Resource Directory may serve as a constant source of the latest information provided by a sleepy device.

This present disclosure describes a variety of techniques that may be used to implement a Resource Directory for legacy devices, such as ZigBee® devices.

Figure 1:
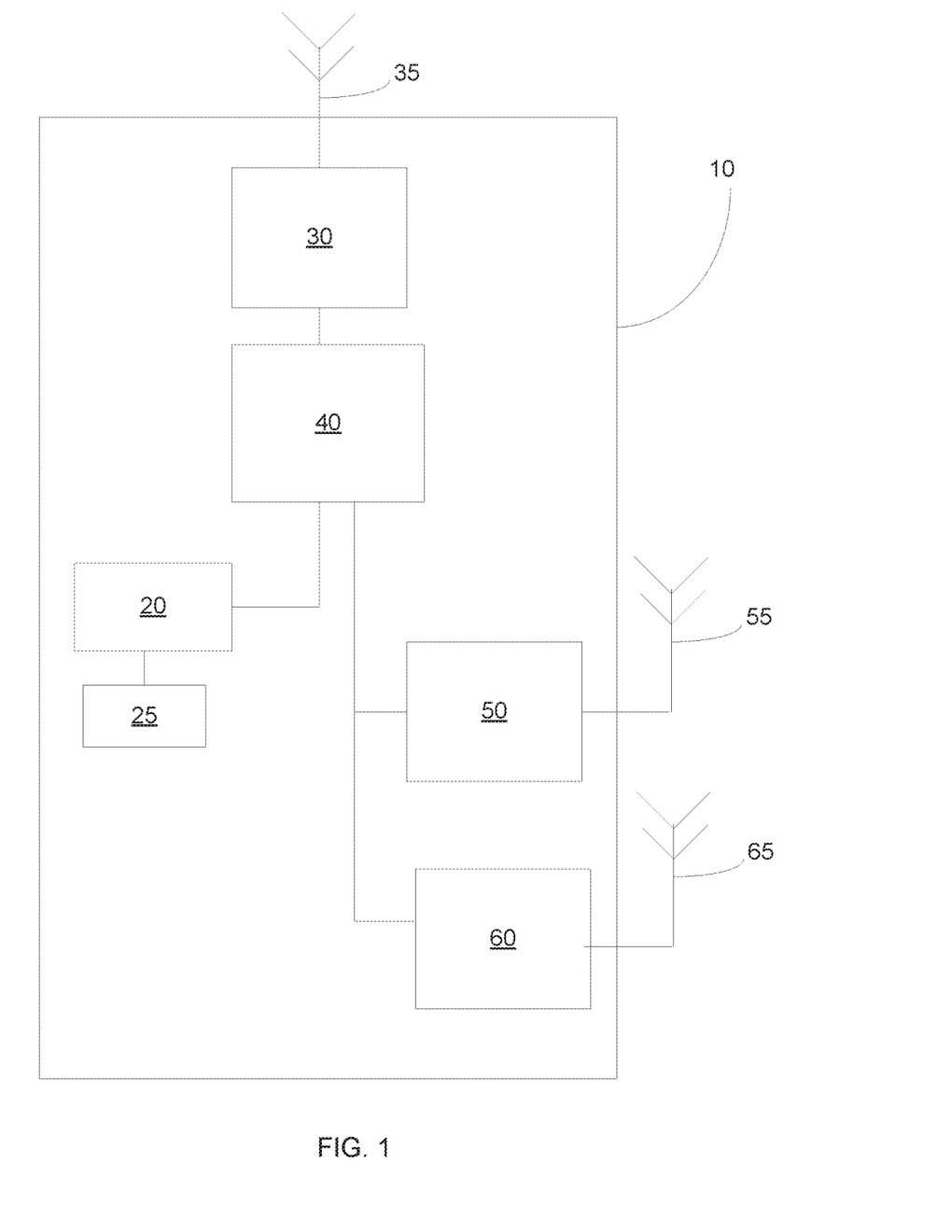
FIG. 1 is a block diagram of a gateway device according to one embodiment.

FIG. 1 shows a block diagram of a representative gateway device 10. The gateway device 10 has a processing unit 20 and an associated memory device 25. This memory device 25 contains the instructions, which, when executed by the processing unit 20, enable the gateway device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM.

The gateway device 10 also includes a DotDot network interface 30, which may be a wireless interface including an antenna 35. As stated above, DotDot defines an application layer. Therefore, the network interface may support any network protocol supported by DotDot, such as IPv4 and IPv6. Therefore, the DotDot network interface 30 may be any interface that supports the DotDot protocol. For example, in certain embodiments, the DotDot network interface 30 may be an ethernet network controller. In other embodiments, the DotDot network interface 30 may be a WIFI network controller.

In this disclosure, the DotDot network interface 30 may be referred to as the primary network interface, while all other network interfaces are referred to as secondary network interfaces. Further, throughout this disclosure, the term "legacy device" is used to denote any device that does not use the DotDot protocol.

The gateway device 10 may include a second memory device 40 in which data that is received by the DotDot network interface 30, and data that is to be transmitted by the DotDot network interface 30, is stored. This second memory device 40 is traditionally a volatile memory. The processing unit 20 has the ability to read and write the second memory device 40 so as to communicate with the other nodes in the network. Although not shown, the gateway device 10 also has a power supply, which may be a battery or a connection to a permanent power source, such as a wall outlet.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language and is not limited by this disclosure. Thus, in some embodiments, there may be multiple computer readable media that contain the instructions described herein. The first computer readable media may be in communication with the processing unit 20, as shown in FIG. 1. The second computer readable media may be a CDROM, or a different memory device, which is located remote from the gateway device 10. The instructions contained on this second computer readable media may be downloaded onto the memory device 25 to allow execution of the instructions by the gateway device 10.

The gateway device 10 may also include a second network interface 50. This second network interface 50 may support any wireless network, including ZIGBEE®, BLUETOOTH®, BLE, a cellular protocol, such as 3G, GCM, CDMA, 4G, LTE, or other protocols. The second network interface 50 may include a second antenna 55.

In certain embodiments, the gateway device 10 may include a third network interface 60 with a third antenna 65. For example, the second network interface 50 may support ZigBee® and the third network interface 60 may support another wireless protocol, such as BLE or BLUETOOTH®. In fact, an arbitrary number of secondary network interfaces may be disposed on the gateway device 10. For example, there may be a plurality of secondary network interfaces to support ZigBee®, BLUETOOTH®, BLE and others.

Figure 2:
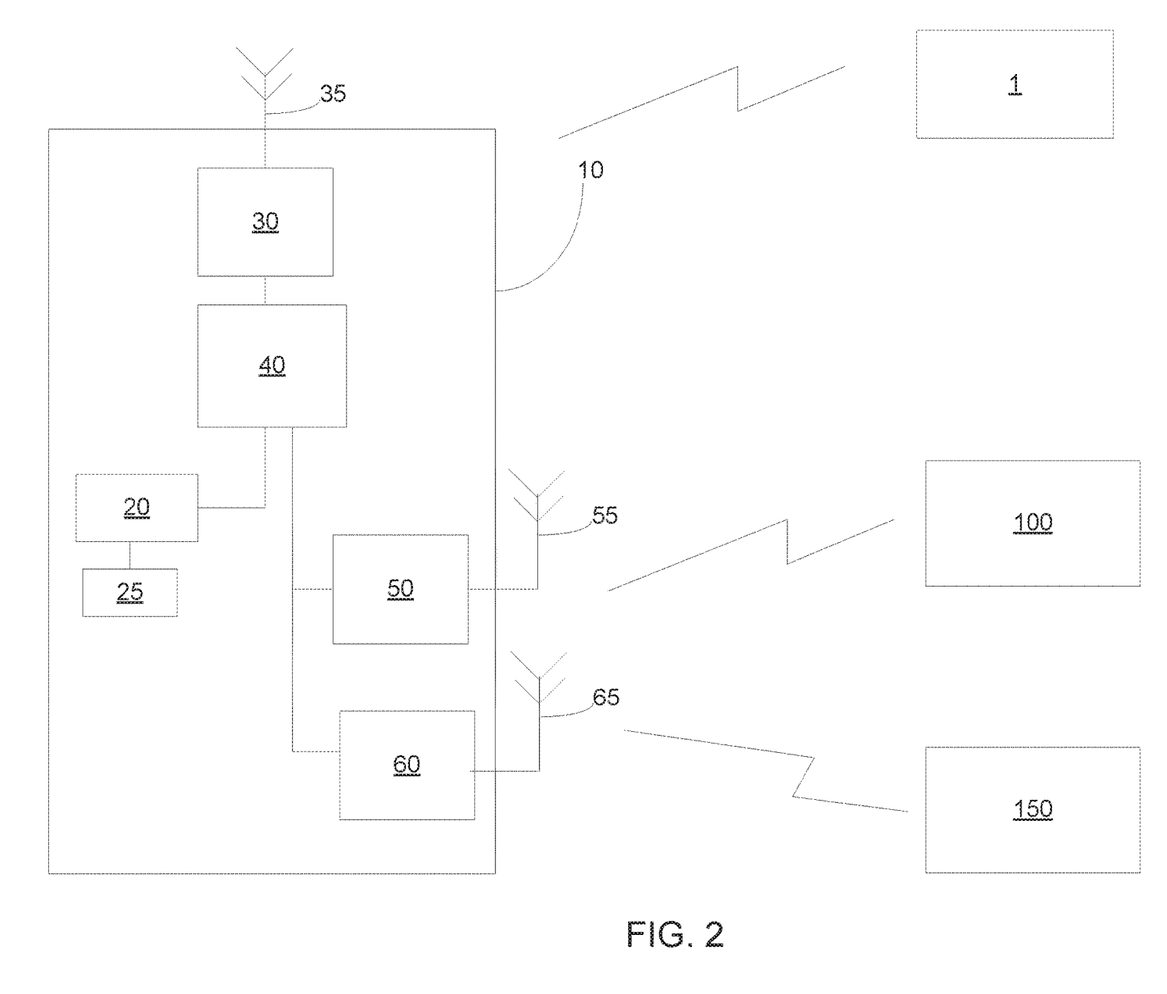
FIG. 2 shows the gateway device of FIG. 1 in one implementation.

FIG. 2 shows the gateway device 10 in communication with a ZIGBEE® device 100. The gateway device 10 uses the existing ZIGBEE® standard to communicate with the ZIGBEE® device 100. As is well known, ZIGBEE® operates using the standard defined in IEEE 802.15.4. In other words, the IEEE 802.15.4 specification defines the physical and media access control layers of the network. The ZIGBEE® standard defines the higher level network protocols. The ZIGBEE® device 100 may be an end device or a sleepy device. The gateway device 10 serves as the parent node on the ZIGBEE® network. The gateway device 10 may be a coordinator device or a router device. The second network interface 50 of the gateway device 10 provides the hardware support to communicate to the ZIGBEE® device 100.

FIG. 2 also shows the gateway device 10 in communication with a second network device 150. In certain embodiments, the third network interface 60 is used to communicate with the second network device 150. This second network device 150 may communicate using the BLUETOOTH® or BLUETOOTH® Low Energy (BLE) protocol, for example. In other embodiments, this second network device 150 may communicate using a different protocol, such as another protocol based on IEEE 802.15.4. In still other embodiments, the second network device 150 may not be present. In other embodiments, the ZIGBEE® device 100 is not present, and only the third network interface 60 is used. Further, the number of secondary network interfaces that may be disposed on the gateway device 10 is not limited by this disclosure. In other words, although the present disclosure describes a first network interface to communicate using the DotDot protocol and two secondary network interfaces, any number of secondary network interfaces may be employed. Further, the number of devices that communicate with the gateway device 10 is not limited by this disclosure.

In certain embodiments, network protocols that utilize the same physical layer may be accessed using the same secondary network interface. In other embodiments, separate secondary network interfaces may be used for different protocols.

Finally, FIG. 2 shows the gateway device 10 in communication with another DotDot device 1. The gateway device communicates with the DotDot device 1 using the DotDot network interface 30. As described above, the DotDot network interface 30 may be WIFI, Ethernet or another other communication mechanism that utilizes the IP protocol.

Figure 3:
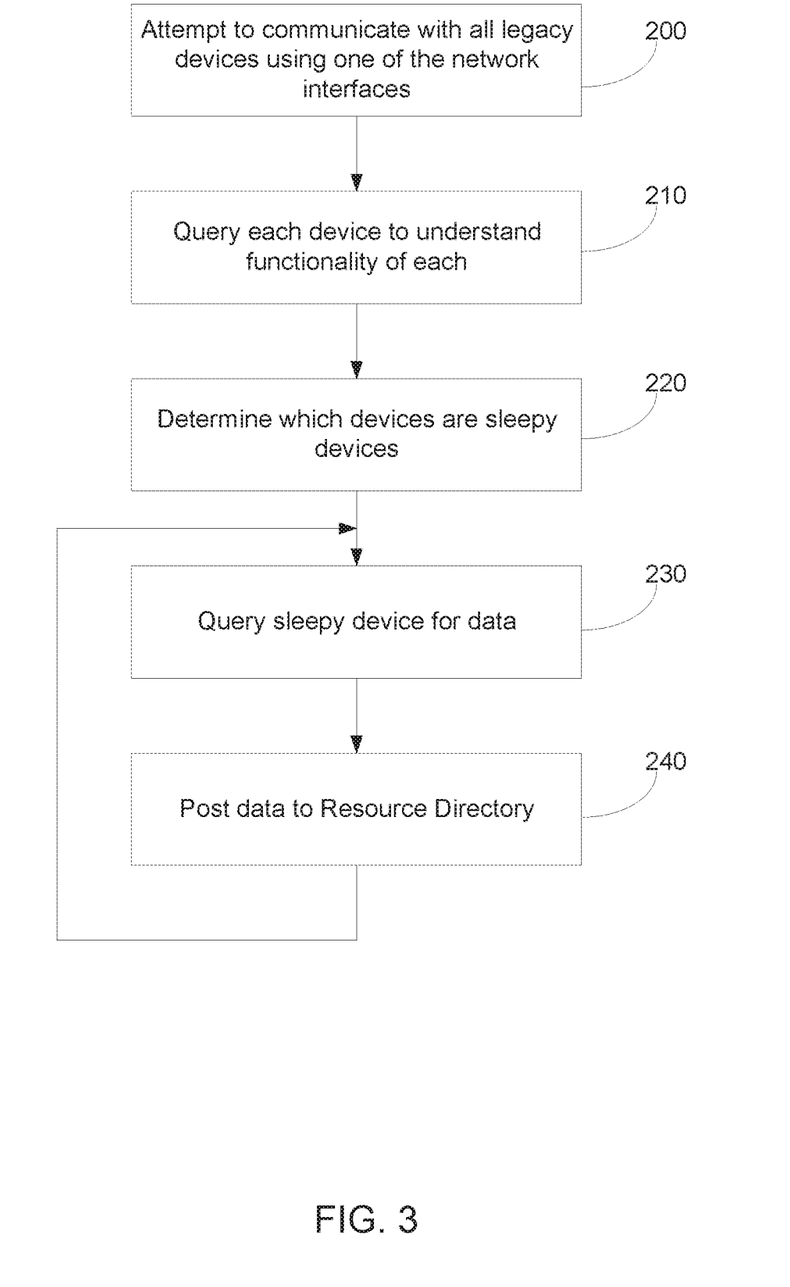
FIG. 3 illustrates a flowchart showing the overall operation of the gateway device.

As described above, a Resource Directory may be used to share information obtained from a sleepy device. FIG. 3 shows a representative flowchart showing the operation of the gateway device 10. In operation, the gateway device 10 uses a secondary network interface, such as the second network interface 50, to attempt to communicate with legacy devices, such as the ZIGBEE® device 100 and any other ZIGBEE® devices within its listening range, as shown in Box 200. Once the gateway device 10 has enumerated all of the ZIGBEE® devices, it then queries each device to understand its functionality, as shown in Box 210. For example, some ZIGBEE® devices may be sensors, others may be lighting devices, others may be switching devices to control the lighting devices. In certain embodiments, a ZIGBEE® device may have more than one function. For example, a ZIGBEE® device may be a combination occupancy sensor and thermostat device. Once the gateway device 10 has fully enumerated all of the devices in communication with the second network interface 50, and queried each device to understand its functions, it determines which of these device is a sleepy device, as shown in Box 220. In other embodiments, the gateway device may simply communicate with the legacy devices without regard for whether they are sleepy devices.

The gateway device 10 then queries each sleepy device for data, as shown in Box 230. This data may include a temperature reading, for example. Since the sleepy device is often in the low power state, the gateway device 10 may make use of other mechanisms to query the sleepy device. For example, the gateway device 10 may have a queue of outgoing messages for each sleepy device, which may be retrieved by the sleepy device when it exits its low power state. The gateway may also set up the sleepy device to proactively report changes of sensor readings, such as temperature reading, based on relevant algorithms. Once the gateway device 10 receives the data from the sleepy device, it posts this data to the Resource Directory, as shown in Box 240. The process of obtaining new data from the sleepy device and posting this data to the Resource Directory may be repeated as many times as desired.

The Resource Directory can reside in one of several locations. First, the Resource Directory may be contained within the gateway device 10. In this embodiment, the gateway device 10 would indicate that it is a Resource Directory and other DotDot devices would obtain data from sleepy devices from the gateway device 10. Second, the Resource Directory may reside on a virtual DotDot device that is created by the gateway device 10. In this embodiment, the gateway device 10 would indicate that a virtual DotDot device is a Resource Directory and other DotDot devices would obtain data from sleepy devices by accessing this virtual DotDot device. Third, the gateway device 10 may post the data to a Resource Directory that resides on the DotDot network. Each of these approaches will be described in more detail below.

In the first embodiment, the gateway device 10 serves as the Resource Directory for any legacy sleepy devices located on its secondary network interfaces.

Figure 4:
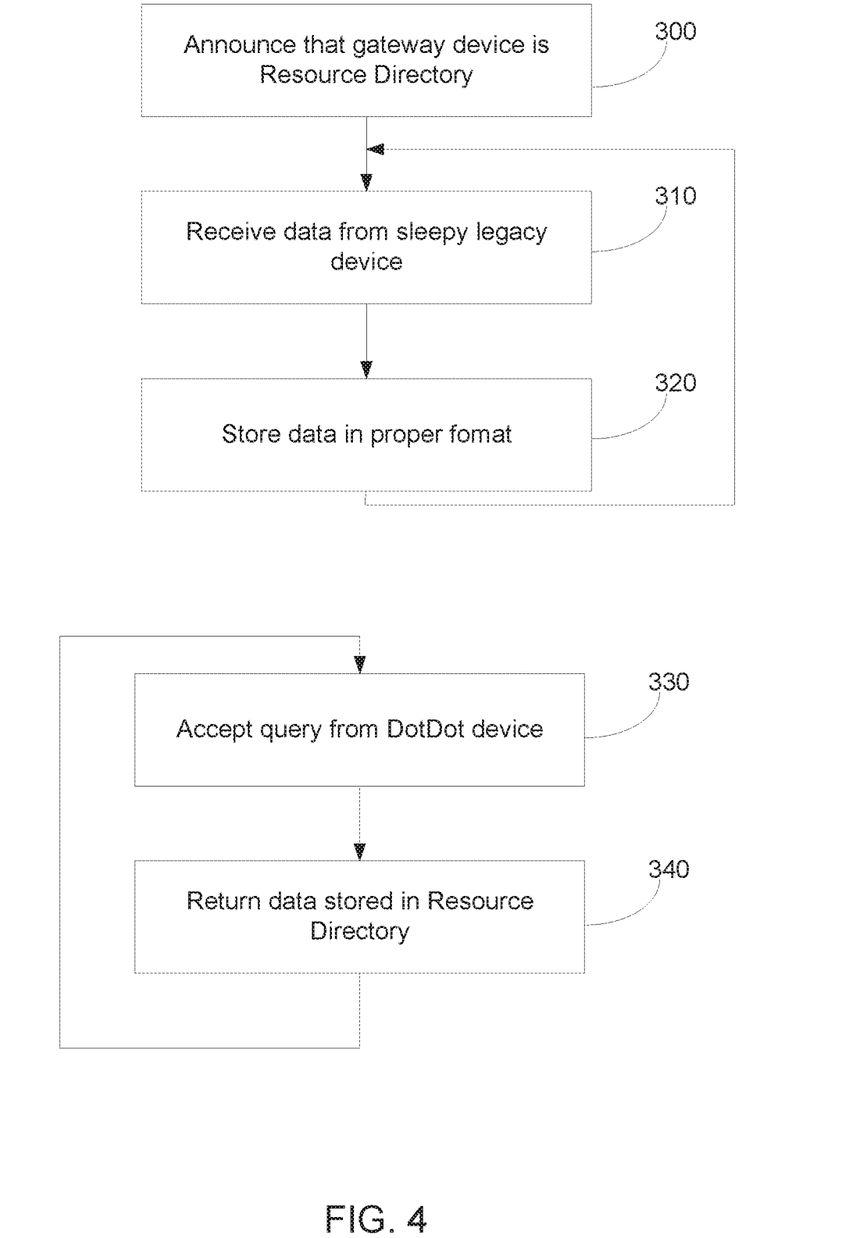
FIG. 4 illustrates a flowchart showing the operation of the gateway device according to one embodiment.

FIG. 4 shows a flowchart that demonstrates how the gateway device 10 can operate as the Resource Directory according to this embodiment.

First, as shown in Box 300 of FIG. 4 and described above, the gateway device 10 announces that it is the Resource Directory for the DotDot network. The DotDot specification provides details regarding this process. The gateway device 10 then receives data from any sleepy legacy devices that are resident on its secondary network interfaces, as shown in Box 310. The gateway device 10 then stores this data in the proper format defined for a Resource Directory, as shown in Box 320. In certain embodiments, the gateway device 10 stores the data in the second memory device 40. In other embodiments, the data is stored in a different memory device, such as memory device 25 or an additional memory device not shown in FIG. 1.

Boxes 310-320 represent the sequence used to convert data from sleepy legacy devices to the format used in the Resource Directory. This sequence is repeated each time new data is available from a sleepy legacy device.

The gateway device 10 also accepts queries from other DotDot devices, which are received on the DotDot network interface 30, as shown in Box 330. In response to these queries, the gateway device 10 returns the data stored in the Resource Directory, as shown in Box 340. Thus, Boxes 330-340 represent the sequence used to provide data from sleepy legacy devices to other DotDot devices.

In the second embodiment, the gateway device 10 creates a virtual device that serves as the Resource Directory for any legacy sleepy devices located on its secondary network interfaces.

The major difference between this embodiment and the previous embodiment is that the Resource Directory appears to be on a device different from the gateway device 10.

For example, the gateway device 10 may present the legacy devices on its secondary network interfaces as Thread devices or DotDot devices. The gateway device 10 may indicate that it represents a router or gateway that resides between the public DotDot network and these devices. The gateway device 10 may then create a virtual device which also appears to be a Thread or DotDot device. This virtual device may appear as an endpoint on the gateway device 10, a separate device having a unique IPv6 address, or a separate device having a unique port number associated with the IPv4 address of the gateway device 10.

Figure 5:
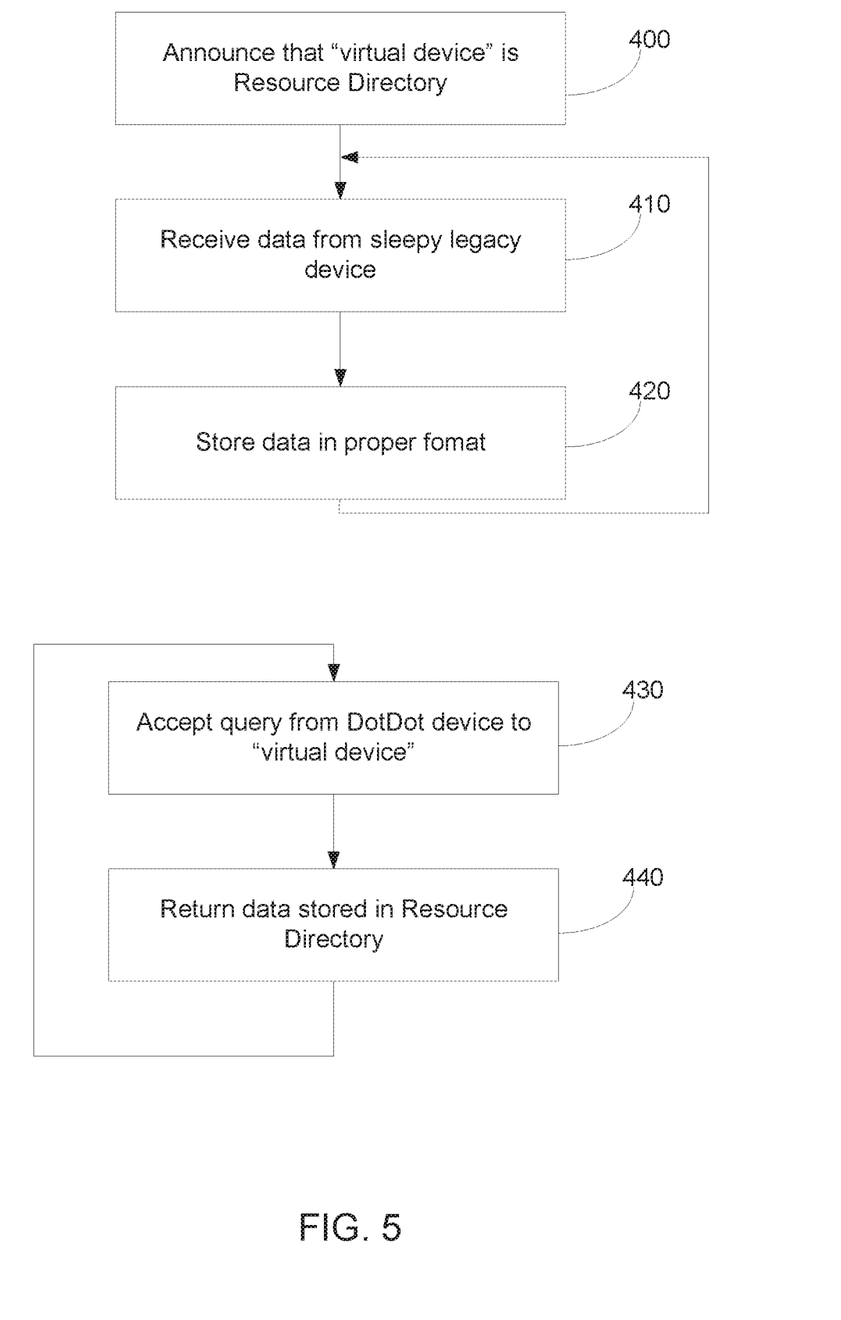
FIG. 5 illustrates a flowchart showing the operation of the gateway device according to a second embodiment.

FIG. 5 shows a flowchart that demonstrates how the gateway device 10 can operate according to this embodiment. First, as shown in Box 400 of FIG. 5 and described above, the gateway device 10 announces that the "virtual device" is the Resource Directory for the DotDot network. Part of this announcement may include the address of the "virtual address", which is different than the address of the gateway device 10. In other words, the gateway device 10 announced that a Resource Directory is located on a private network accessible by the gateway device 10. The DotDot specification provides details regarding this process. The gateway device 10 then receives data from any sleepy legacy devices that are resident on its secondary network interfaces, as shown in Box 410. The gateway device 10 then stores this data in the proper format, as shown in Box 420. In certain embodiments, the gateway device 10 stores the data in the second memory device 40. In other embodiments, the data is stored in a different memory device, such as memory device 25 or an additional memory device not shown in FIG. 1.

Boxes 410-420 represent the sequence used to convert data from sleepy legacy devices to the format used in the Resource Directory. This sequence is repeated each time new data is available from a sleepy legacy device.

The gateway device 10 also accepts queries from other DotDot devices to the "virtual device". These queries are received on the DotDot network interface 30, as shown in Box 430. In response to these queries, the gateway device 10 returns the data stored in the Resource Directory, as shown in Box 440. This data is returned to the DotDot device as if it originated at the "virtual device". Thus, in this embodiment, the gateway device 10 and the Resource Directory appear to be two different devices to the rest of the DotDot network. Boxes 430-440 represent the sequence used to provide data from sleepy legacy devices to other DotDot devices.

In the third embodiment, the gateway device 10 utilizes an already existing DotDot device that is disposed on the DotDot network and serves as the Resource Directory. The gateway device 10 posts all data from the legacy sleepy devices located on its secondary network interfaces to this external Resource Directory. Thus, in this embodiment, the gateway device 10 learns the identity of the Resource Directory that can be accessed on its DotDot network interface 30. It then posts any data that it receives from the legacy sleepy devices to this Resource Directory on behalf of those legacy devices.

Figure 6:
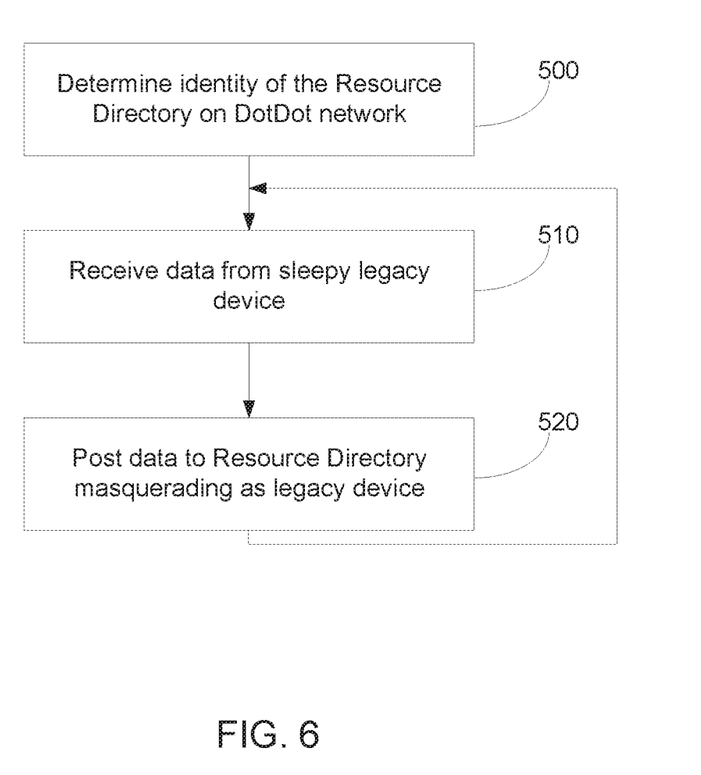
FIG. 6 illustrates a flowchart showing the operation of the gateway device according to a third embodiment.

FIG. 6 shows a flowchart that demonstrates how the gateway device 10 can operate according to this embodiment. First, as shown in Box 500 of FIG. 6 and described above, the gateway device 10 determines the identity of the Resource Directory that is accessible on its DotDot network interface 30. For example, in one embodiment, shown in FIG. 2, DotDot device 1 may be a Resource Directory. The identity of the Resource Directory may be determined using techniques defined in the art. Unlike the previous embodiments, in this embodiment, the gateway device 10 does not serve as a Resource Directory. Rather, it simply makes use of an existing Resource Directory. Like in the other embodiments, the gateway device 10 obtains data from a sleepy legacy device, as shown in Box 510. The gateway device 10 then posts this data at the Resource Directory, as shown in Box 520. In certain embodiments, the gateway device 10 masquerades as the legacy sleepy device while communicating with the Resource Directory. In other words, the communication from the gateway device 10 may indicate that the communication is being sent by the legacy device. This may be done by changing the source address indicated in the communication.

The present disclosure describes several embodiments in which the gateway device 10 may employ a Resource Directory so that information from a sleepy legacy device may be made available to other DotDot devices on the DotDot network. This mechanism is needed in order to allow legacy devices, and especially sleepy legacy devices, to be functional in a DotDot network.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A gateway device, comprising:
   a DotDot network interface in communication with a DotDot network;
   a secondary network interface;
   a processing unit and a memory device, where the memory device comprises instructions, which when executed by the processing unit, allow the gateway device to:
      create a virtual device, the virtual device having a different IPv6 address than the gateway;
      communicate with a legacy sleepy device on the secondary network interface;
      obtain data from the legacy sleepy device; and
      post the data from the legacy sleepy device in a Resource Directory, wherein the Resource Directory is a mechanism defined by CoAP (Constrained Application Protocol) to allow for discovery of devices on the DotDot network, and
      wherein the Resource Directory is disposed on the virtual device.

2. The gateway device of claim 1, wherein a plurality of legacy sleepy devices is accessible via the secondary network interface, and the gateway device posts data from each of the plurality of the legacy sleepy devices in the Resource Directory.

3. The gateway device of claim 1, wherein the gateway device obtains updated data from the legacy sleepy device and updates the data in the Resource Directory.

4. The gateway device of claim 1, further comprising instructions, which when executed by the processing unit, allow the gateway device to:
   store the data in a format that is defined for a Resource Directory.

5. A gateway device, comprising:
   a DotDot network interface in communication with a DotDot network;
   a secondary network interface;

a processing unit and a memory device, where the memory device comprises instructions, which when executed by the processing unit, allow the gateway device to:
- create a virtual device, the virtual device having a different IPv6 address than the gateway;
- indicate to DotDot devices via the DotDot interface that a Resource Directory is disposed on the virtual device, wherein the Resource Directory is a mechanism defined by CoAP (Constrained Application Protocol) to allow for discovery of devices on the DotDot network;
- receive data from a legacy sleepy device on the secondary network interface; and
- return the data from the legacy sleepy device to a DotDot device in response to a query of the Resource Directory.

6. The gateway device of claim 5, wherein the secondary network utilizes a ZIGBEE® protocol.

7. The gateway device of claim 1, wherein the secondary network utilizes a ZIGBEE® protocol.

8. The gateway device of claim 5, wherein the gateway device stores the data received from the legacy sleepy device in the Resource Directory.

9. The gateway device of claim 8, wherein a plurality of legacy sleepy devices is accessible via the secondary network interface, and the gateway device stores data from each of the plurality of the legacy sleepy devices in the Resource Directory.

10. The gateway device of claim 5, wherein the gateway device receives updated data from the legacy sleepy device and updates the data in the Resource Directory.

11. The gateway device of claim 5, further comprising instructions, which when executed by the processing unit, allow the gateway device to:
- store the data in a format that is defined for a Resource Directory.

* * * * *